United States Patent
Yang et al.

(10) Patent No.: US 12,054,404 B2
(45) Date of Patent: Aug. 6, 2024

(54) PREPARATION METHOD AND APPLICATION OF CLAY/TANNIC ACID/METAL ION COMPOSITE MATERIAL FOR EFFICIENT ADSORPTION OF ANTIBIOTICS

(71) Applicants: Nanjing University, Nanjing (CN); Quanzhou institute for Environmental Protection industry, Nanjing University, Nanjing (CN)

(72) Inventors: Hu Yang, Nanjing (CN); Qianqian Chang, Nanjing (CN)

(73) Assignees: NANJING UNIVERSITY, Nanjing (CN); QUANZHOU INSTITUTE FOR ENVIRONMENTAL PROTECTION INDUSTRY, NANJING UNIVERSITY, Nanjing (CN)

( * ) Notice: Subject to any disclaimer, the term of this patent is extended or adjusted under 35 U.S.C. 154(b) by 0 days.

(21) Appl. No.: 18/511,968

(22) Filed: Nov. 16, 2023

(65) Prior Publication Data
US 2024/0083777 A1    Mar. 14, 2024

Related U.S. Application Data

(63) Continuation of application No. PCT/CN2022/107803, filed on Jul. 26, 2022.

(30) Foreign Application Priority Data

Oct. 22, 2021    (CN) .......................... 202111233316.1

(51) Int. Cl.
*C02F 1/28*    (2023.01)
*B01J 20/02*    (2006.01)
(Continued)

(52) U.S. Cl.
CPC ........... *C02F 1/281* (2013.01); *B01J 20/0211* (2013.01); *B01J 20/12* (2013.01); *B01J 20/24* (2013.01);
(Continued)

(58) Field of Classification Search
None
See application file for complete search history.

(56) References Cited

U.S. PATENT DOCUMENTS

2022/0132858 A1* 5/2022 John ..................... A01N 31/08
                                                                 424/647
2022/0220009 A1* 7/2022 Rathnayake ............ C02F 1/288

OTHER PUBLICATIONS

Xiujie Li et al., Metal-phenolic Network for Adsorption Removal of Tetracycline, Contemporary Chemical Industry, Apr. 2021, pp. 868-872, vol. 50—issue 4.
Usman Rasheed et al., Synthesis and characterization of tannic acid pillared bentonite composite for the efficient adsorption of aflatoxins, Colloids and Surfaces B: Biointerfaces, Mar. 8, 2021, published by Elsevier B.V.
(Continued)

*Primary Examiner* — Chester T Barry
(74) *Attorney, Agent, or Firm* — Zhigang Ma

(57) ABSTRACT

A preparation method and an application of a clay/tannic acid/metal ion composite material for efficient adsorption of antibiotics are provided, which relate to the field of water environment treatments. A clay/tannic acid/metal ion composite adsorbent is prepared, preparation method and operation process are simple, synthesis time is short, and yield is large. A raw material used is tannic acid, which has a wide range of sources, is non-toxic, biodegradable, and has no risk of secondary pollution, due to abundant phenolic hydroxyl groups in tannic acid, the tannic acid can not only chelate with the metal ions, but also adsorb pollutants from water, when combined with the clay and the metal ions, a composite body is formed, which has a rougher surface, and adsorption active sites are increased, thereby effectively increasing adsorption, and improving an adsorption perfor- (Continued)

mance for pollutants. The clay/tannic acid/metal ion composite adsorbent has good adsorption effect for antibiotics.

4 Claims, 4 Drawing Sheets

(51) Int. Cl.
    *B01J 20/12*     (2006.01)
    *B01J 20/24*     (2006.01)
    *B01J 20/30*     (2006.01)
    *C02F 101/38*     (2006.01)

(52) U.S. Cl.
    CPC ....... *B01J 20/3078* (2013.01); *C02F 2101/38* (2013.01); *C02F 2101/40* (2013.01)

(56) References Cited

OTHER PUBLICATIONS

Wen Li, Bentonite loaded tannic acid and its application in the treatment of chromium containing wastewater, China Acadamic Journal Electronic Publishing House.

CNIPA, Notification of Second Office Action for CN202111233316. 1, Jun. 14, 2022.

Nanjing University and Quanzhou Institute for Environmental Protection Industry, Nanjing University (Applicants), Reply to Notification of Second Office Action for CN202111233316.1, w/ (allowed) replacement claims, Jun. 14, 2022.

CNIPA, Notification to grant patent right for invention in CN202111233316.1, Jun. 28, 2022.

* cited by examiner ns. Clay materials
are chemically composed of aluminosilicate without definite
molecules, and their physical structure is usually lamellar.
The clay material is characterized by strong plasticity, can
present a specific structure without cracking, and can deform
under low pressure when encountering water and maintain a
specific shape for a long time; moreover, a specific surface
area of the clay material is large, a surface of particles of the
clay material has negative charge, the clay material has good
physical adsorption performance and surface chemical
activity, and can be used as a good carrier material and react
with other substances.

PREPARATION METHOD AND APPLICATION OF CLAY/TANNIC ACID/METAL ION COMPOSITE MATERIAL FOR EFFICIENT ADSORPTION OF ANTIBIOTICS

TECHNICAL FIELD

The disclosure relates to the field of water environment treatments, and more particularly to an adsorbent prepared by a simple one-step reaction of a clay material, a natural polymer tannic acid and metal ions, so as to achieve an effect of efficient adsorption of antibiotics in water.

BACKGROUND

A wide application of pharmaceuticals and personal care products (PPCPs) not only improves a life style and level of human beings, but also attracts widespread attention as a new type of pollutant in recent years. Antibiotics are one of main types of the PPCPs, the antibiotics are widely used by people due to its broad-spectrum antibacterial property and low side effect, and the antibiotics include sulfonamides, fluoroquinolones, tetracyclines, β-lactams and macrolides. Due to incomplete absorption and metabolism, 10 percent (%) to 90% of the antibiotics are expelled from a human body with a form of metabolites after entering the human body or an animal body. On the one hand, due to a low removal efficiency of the antibiotics in traditional sewage-treatment plants, the antibiotics enter environment with a reuse of reclaimed water, on the other hand, the antibiotics used in livestock and fishery are expelled to the environment. The antibiotics in the environment will induce the production of bacterial resistance genes, which will pose a serious threat to the ecological environment. Moreover, the antibiotics in the environment can be accumulated in animals and plants, ultimately enter the human body through a food chain, which will pose a potential threat to human health. Therefore, environment problems caused by overusing the antibiotics have attached more attention from people, antibiotic pollution becomes a major environmental pollution problem to be solved urgently at present.

At present, antibiotic drugs are mainly removed by using an advanced oxidation process, a membrane separation method and an adsorption method. However, in a practice application, the advanced oxidation process needs a high cost and may generate a more toxic by-product; the membrane separation method is greatly affected by temperature, organic compounds and soluble salts, which easily causes a membrane fouling, reduces a membrane flux, and affects a degradation performance; and the adsorption method has advantages of simple process, low energy consumption, high removal efficiency, and no toxic intermediate product generation, however, existing adsorbents used in the adsorption method have disadvantages of large dosage, high cost and low adsorption efficiency. Therefore, it is necessary to develop an adsorbent with low cost and high adsorption capacity for adsorbing different antibiotics.

Natural polymers have characteristics of low cost, environmental protection and wide sources, tannic acid is rich in resources and widely exists in persimmon skin, grape skin, tea and other plants, a content of the tannic acid in plants is second only to cellulose, hemicellulose and lignin, and the tannic acid is a kind of water-soluble, hydroxyl-rich polyphenol with universal adhesion. Phenolic hydroxyl group of the tannic acid can chelate with metal ions to form a five or six membered chelating ring compound. However, the tannic acid is easily soluble in water and cannot be directly used as an adsorbent, which hinders its development as an adsorbent.

Clay is an important component of soil particles (i.e., particle size is smaller than 2 microns (μm)) and is a common substance in our daily life, and the clay is widely distributed in nature and has a high content. Clay materials are chemically composed of aluminosilicate without definite molecules, and their physical structure is usually lamellar. The clay material is characterized by strong plasticity, can present a specific structure without cracking, and can deform under low pressure when encountering water and maintain a specific shape for a long time; moreover, a specific surface area of the clay material is large, a surface of particles of the clay material has negative charge, the clay material has good physical adsorption performance and surface chemical activity, and can be used as a good carrier material and react with other substances.

Chinese patent with publication NO. CN111229176A discloses a method for modifying tannic acid by polyethyleneimine to remove heavy metal ions such as lead ions and copper ions; Chinese patent with publication NO. CN109078616B discloses a tannic acid/gelatin/graphene oxide composite material as a dye adsorption material; and Chinese patent with publication NO. CN109225144A discloses a method for synthesizing a metal organic frame (MOF) material by zirconium tetrachloride, phthalate and cobalt sulfate, a period for the reaction process needs 20-30 hours (h), and a maximum adsorption capacity of fluoroquinolone antibiotics levofloxacin hydrochloride by the MOF material is 70.21 milligrams per gram, abbreviated as mg/g (i.e., 0.176 mole per gram, abbreviated as mol/g). However, patents related to modification of the tannic acid have problems such as not reducing antibiotics in water, or long synthesis time, complex reaction process, and low adsorption capacity of related patent materials of adsorbing the antibiotics.

SUMMARY

A purpose of the disclosure is to provide a novel composite adsorbent and its preparation method, the novel composite adsorbent is synthesized by a simple method of a natural polymer material tannic acid, a clay mineral material and metal ions, and the novel composite adsorbent is applied in sewage to achieve an effect of efficient adsorption of antibiotics. The tannic acid is immobilized on the clay material by cross-linking with the metal ions, and an adsorption capacity for antibiotic pollutants is improved under a joint action of the three factors (i.e., the clay material, the tannic acid and the metal ions).

In order to solve technical problems of the disclosure, a proposed technical solution is a preparation method of a clay/tannic acid/metal ion composite material for efficient adsorption of antibiotics, and the clay/tannic acid/metal ion composite material is a composite adsorbent prepared by mixing a natural polymer material, a clay mineral material and metal ions; the natural polymer material is tannic acid; the clay mineral material is kaolin, montmorillonite, attapulgite, bentonite or illite; and the metal ions are iron ions, copper ions, aluminum ions, magnesium ions or titanium ions; the preparation method includes the following steps: the natural polymer material tannic acid is fully dissolved in water to obtain a tannic acid solution, the metal ions are fully dissolved in water to obtain a metal ion solution, the clay material is dispersed in a buffer solution to obtain a clay dispersion liquid, the tannic acid solution and the metal ion solution are added into the clay dispersion liquid to obtain a mixed solution, a potential of hydrogen (pH) of the mixed solution is adjusted to be greater than 7 to obtain an alkaline mixed solution, the alkaline mixed solution is stirred to react at a room temperature to obtain a reacted solution, the reacted solution is sequentially filtered, washed and dried to obtain a clay/tannic acid/metal ion composite adsorbent (i.e., the clay/tannic acid/metal ion composite material).

In an embodiment, the natural polymer material tannic acid is dissolved in water to obtain the tannic acid solution, the metal ions are dissolved in water to obtain the metal ion solution, after fully dissolving, a molar concentration of the tannic acid solution is in a range of 1-100 millimoles per liter (mmol/L), and a molar concentration of the metal ion solution is in a range of 10-160 mmol/L, the clay material is dispersed in the buffer solution to obtain the clay dispersion liquid, the tannic acid solution and the metal ion solution are added into the clay dispersion liquid to obtain the mixed solution, a pH of the mixed solution is adjusted to be greater than 7 to obtain an alkaline mixed solution, the alkaline mixed solution is stirred to react at a room temperature for 30 seconds (s) to 3 minutes (min) to obtain a reacted solution, the reacted solution is sequentially filtered, washed and dried to obtain the clay/tannic acid/metal ion composite adsorbent.

In an embodiment, a molar ratio of the natural polymer material tannic acid and the metal ions is 1:4; the clay mineral material is kaolin; and the metal ions are titanium ions, and a weight ratio of the tannic acid and the kaolin is 1:1.

In an embodiment, a specific preparation method of the clay/tannic acid/metal ion composite adsorbent includes:
    step 1, adding 2 grams (g) of the kaolin into a 3-morpholinopropanesulfonic acid ($C_7H_{15}NO_4S$) buffer solution to obtain a solution, and performing an ultrasonic dispersion on the solution to obtain a kaolin dispersion liquid; and
    step 2, adding a tannic acid solution with a concentration of 10 mmol/L and a titanium ion solution with a concentration of 40 mmol/L into the kaolin dispersion liquid to obtain a mixed solution, adjusting a pH of the mixed solution to 7.5 to obtain an alkaline mixed solution, obtaining a reacted solution after the alkaline mixed solution reacts at a room temperature for 1 min, and sequentially filtering, washing and drying the reacted solution to obtain a kaolin/tannic acid/titanium ion composite adsorbent with a feed molar ratio of 1:4 between the tannic acid and the mental ions.

In an embodiment, the buffer solution for dispersing the clay mineral material (i.e., clay material) is a tri (hydroxymethyl) aminomethane buffer solution (Tris) or the 3-morpholinopropanesulfonic acid (MOPS) buffer solution.

In an embodiment, a drying method used in preparing kaolin/tannic acid/titanium ion composite adsorbent is a room temperature drying method or a freeze-drying method.

In order to solve the technical problems of the disclosure, another proposed technical solution is an application of the clay/tannic acid/metal ion composite material for efficient adsorption of antibiotics, and the clay/tannic acid/metal ion composite material is applied in sewage to achieve an efficient adsorption of the antibiotics.

In an exemplary embodiment, an application method of the clay/tannic acid/metal ion composite material includes:
    preparing an antibiotic adsorbent based on the clay/tannic acid/metal ion composite material; and
    adding the antibiotic adsorbent into sewage to absorb antibiotics in the sewage, where a weight-volume ratio of the antibiotic adsorbent and the sewage is a preset value.

In an embodiment, the antibiotics include sulfonamides, fluoroquinolones, tetracyclines, β-lactams and macrolides.

Compared to the related art, beneficial effects of the disclosure are as follows.

(1) The clay/tannic acid/metal ion composite adsorbent is prepared by the disclosure using a one-step method, the preparation method and operation process are simple, a synthesis time is short, and a yield is large.

(2) A raw material used by the disclosure is the natural polymer tannic acid, which has a wide range of sources, is non-toxic, biodegradable, and has no risk of secondary pollution, due to abundant phenolic hydroxyl groups in a structure of the tannic acid, the natural polymer tannic acid can not only chelate with the metal ions, but also effectively adsorb pollutants in water bodies, especially when combined with the clay and the metal ions, a new composite body with a unique structure is formed, and the new composite body has a rougher surface, and adsorption active sites are increased, which can effectively increase adsorption, and greatly improve an adsorption performance for pollutants.

(3) The clay/tannic acid/metal ion composite adsorbent of the disclosure has a good adsorption effect for the antibiotics.

(4) Adsorption capacities of a kaolin/tannic acid/titanium ion composite adsorbent, a kaolin/tannic acid/iron ion composite adsorbent and a kaolin/tannic acid/copper ion composite adsorbent gradually decrease, since metal ions with higher valence states have a stronger chelation with ofloxacin, which greatly improve an adsorption capacity for the ofloxacin.

(5) Compared to an adsorption capacity of a kaolin/tannic acid/iron ion composite adsorbent with a feed molar ratio of 1:4 in an embodiment 1 (i.e., Table 2), with an increase of the feed molar ratio, the adsorption capacity of the kaolin/tannic acid/iron ion composite adsorbent for enrofloxacin antibiotics first increases and then slightly decreases, and the adsorption capacity achieves an optimal effect when the feed molar ratio is 1:4.

DETAILED DESCRIPTION OF EMBODIMENTS

The disclosure is described by the following embodiments.

Embodiment 1

A preparation method of a clay/tannic acid/metal ion composite adsorbent is provided, and the method includes the following steps 1-2.

In step 1, 2 grams (g) of kaolin is added into a 3-morpholinopropanesulfonic acid (MOPS) buffer solution to obtain a solution, and an ultrasonic dispersion is performed on the solution to obtain a kaolin dispersion liquid.

Figure 1:
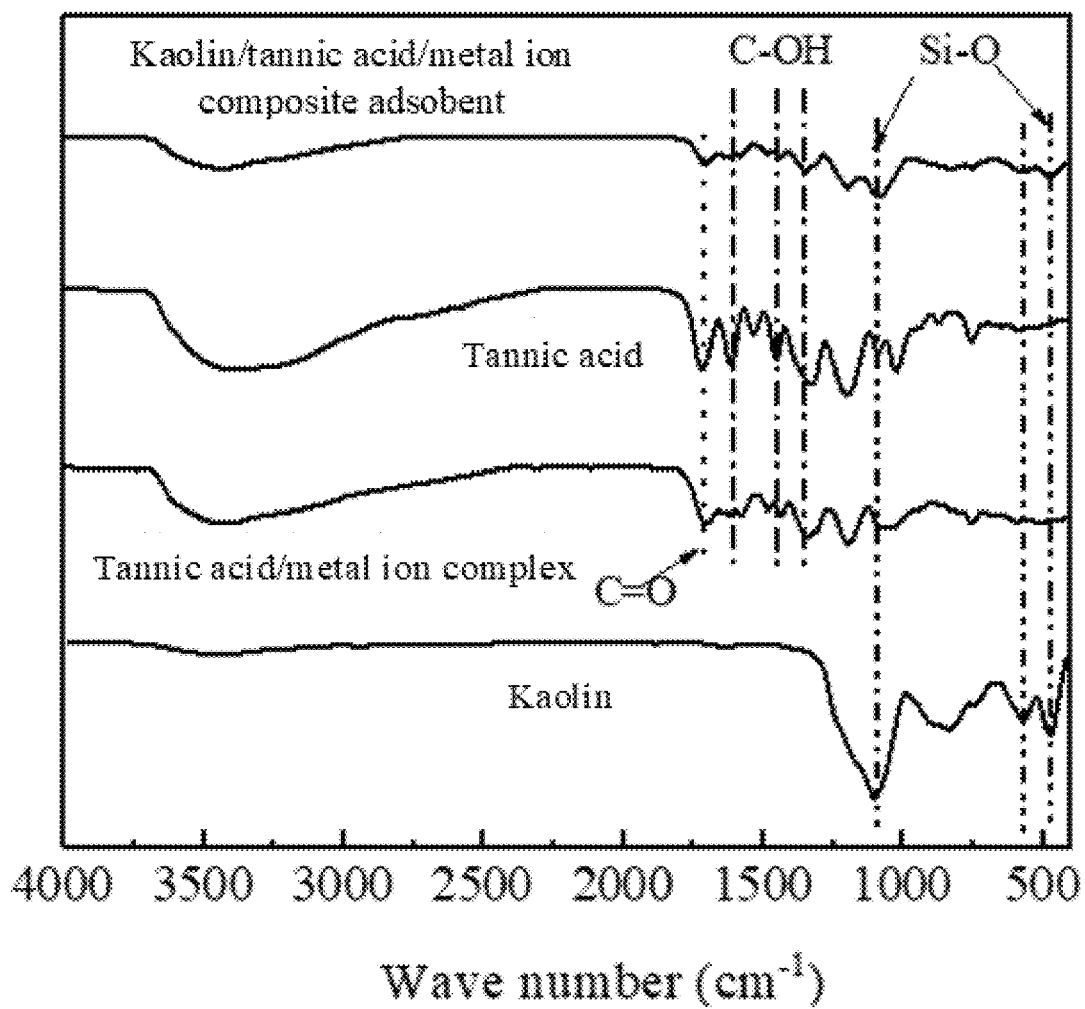
FIG. 1 illustrates an infrared spectrogram of kaolin, tannic acid, a tannic acid/metal ion complex and a kaolin/tannic acid/metal ion composite adsorbent according to an embodiment of the disclosure.
Figure 2:
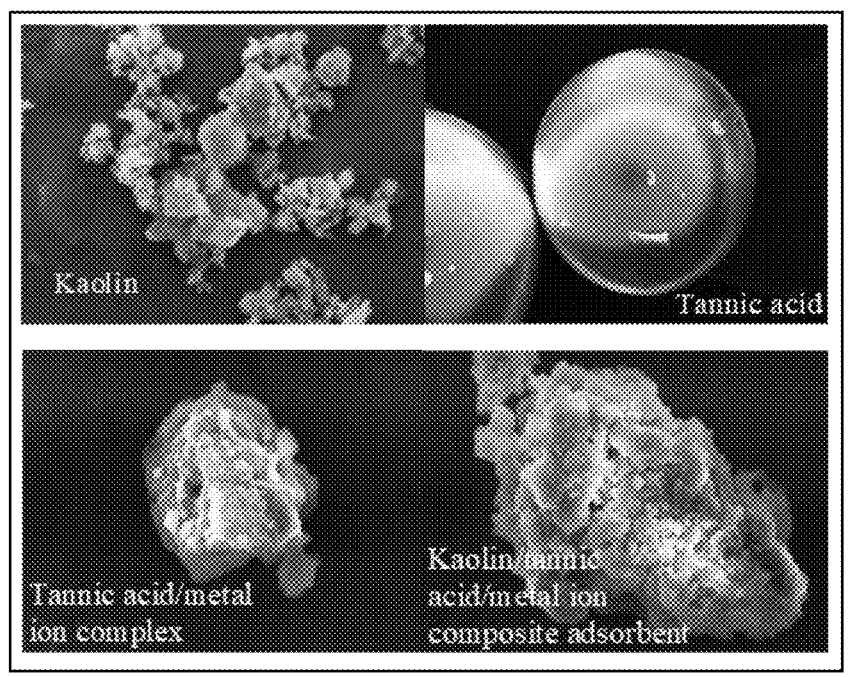
FIG. 2 illustrates a scanning electron microscopy diagram of the kaolin, the tannic acid, the tannic acid/metal ion complex and the kaolin/tannic acid/metal ion composite adsorbent according to an embodiment of the disclosure.

In step 2, a tannic acid solution with a concentration of 10 millimoles per liter (mmol/L) and an iron ion solution with a concentration of 40 mmol/L are added into the kaolin dispersion liquid to obtain a mixed solution, a weight ratio of the tannic acid and the kaolin is 1:1, a potential of hydrogen (pH) of the mixed solution is adjusted to 7.5 to obtain an alkaline mixed solution, a reacted solution is obtained after the alkaline mixed solution reacts at a room temperature for 1 minute (min), and the reacted solution is sequentially filtered, washed and dried at the room temperature to obtain a kaolin/tannic acid/iron ion composite adsorbent with a feed molar ratio of 1:4 between the tannic acid and the metal ions. FIG. 1 illustrates an infrared spectrogram of the kaolin/tannic acid/metal ion composite adsorbent, the infrared spectrogram of the kaolin/tannic acid/metal ion composite adsorbent includes infrared characteristic peaks of a clay (i.e., kaolin) and the tannic acid compared to the clay, the tannic acid and a tannic acid/metal ion complex; moreover, after compounding the tannic acid with the kaolin, a carbonyl (C=O) telescopic vibration peak of the tannic acid at 1720 centimeters$^{-1}$ (cm$^{-1}$) is shifted to 1714 cm$^{-1}$ and a C—O bending vibration peak of the tannic acid at 1325 cm$^{-1}$ is shifted to 1350 cm$^{-1}$, which means that an electron transfer process occurs in the reaction after compounding the tannic acid with the kaolin, a chelating bond is formed between the iron ion and a phenolic hydroxyl group of the tannic acid, and a new composite body with a unique structure is formed. The scanning electron microscopy diagram in FIG. 2 also shows that the kaolin/tannic acid/metal ion composite adsorbent has a rougher surface and a larger specific surface area.

A preparation method of another clay/tannic acid/metal ion composite adsorbent is basically the same as that of the kaolin/tannic acid/iron ion composite adsorbent, except that the step 2 is changed to the following content: the tannic acid solution with the concentration of 10 mmol/L and a titanium ion solution with a concentration of 40 mmol/L are added into the kaolin dispersion liquid to obtain a mixed solution, a pH of the mixed solution is adjusted to 7.5 to obtain an alkaline mixed solution, a reacted solution is obtained after the alkaline mixed solution reacts at the room temperature for 1 min, and the reacted solution is sequentially filtered, washed and dried at the room temperature to obtain a kaolin/tannic acid/titanium ion composite adsorbent.

A preparation method of another clay/tannic acid/metal ion composite adsorbent is basically the same as that of the kaolin/tannic acid/iron ion composite adsorbent, except that the step 2 is changed to the following content: the tannic acid solution with the concentration of 10 mmol/L and a copper ion solution with a concentration of 40 mmol/L are added into the kaolin dispersion liquid to obtain a mixed solution, a pH of the mixed solution is adjusted to 7.5 to obtain an alkaline mixed solution, a reacted solution is obtained after the alkaline mixed solution reacts at the room temperature for 1 min, and the reacted solution is sequentially filtered, washed and dried at the room temperature to obtain a kaolin/tannic acid/copper ion composite adsorbent.

Figure 3:
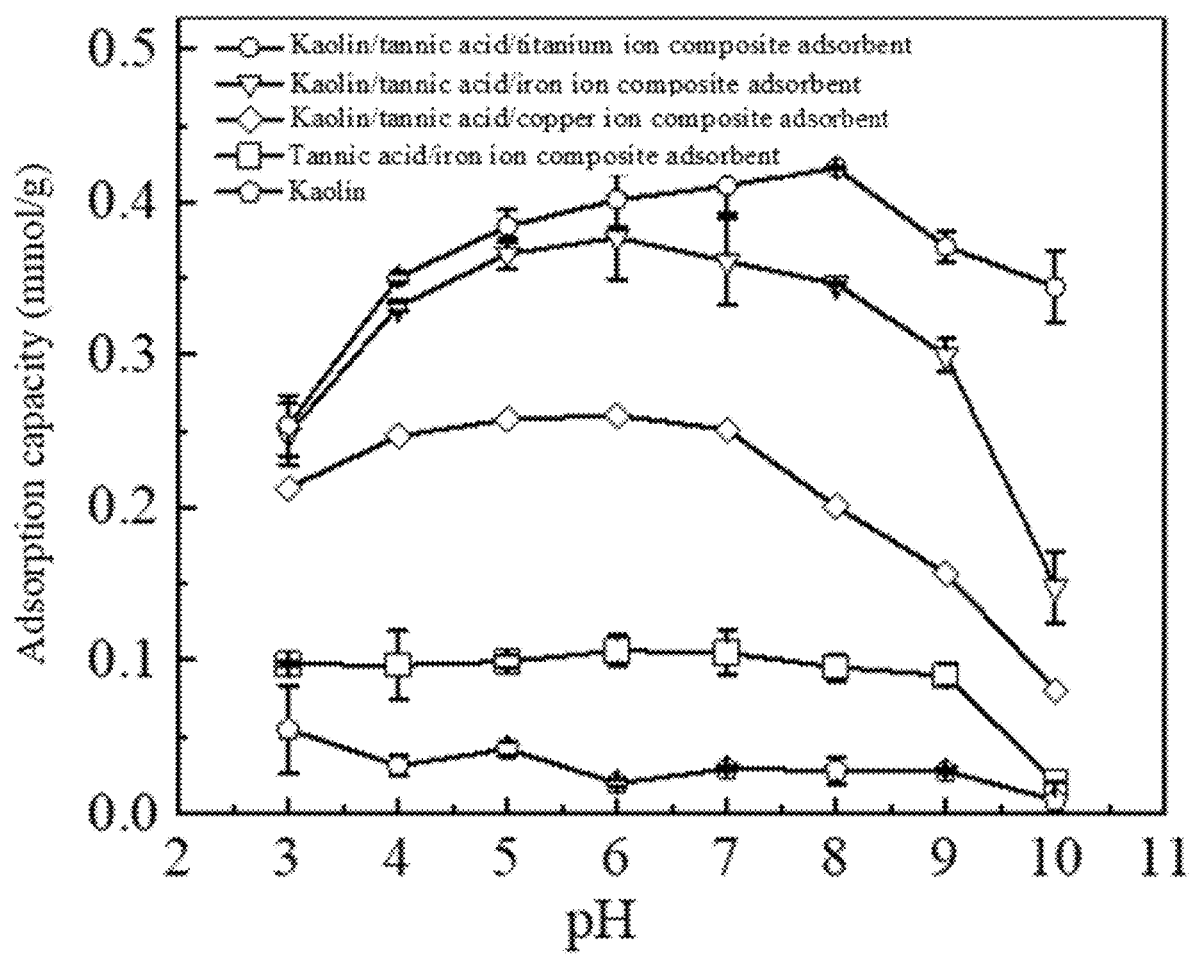
FIG. 3 illustrates a schematic diagram of adsorption capacities of the kaolin, the tannic acid, the tannic acid/metal ion complex and the kaolin/tannic acid/metal ion composite adsorbent for a fluoroquinolone antibiotic: ofloxacin according to an embodiment of the disclosure.
Figure 4:
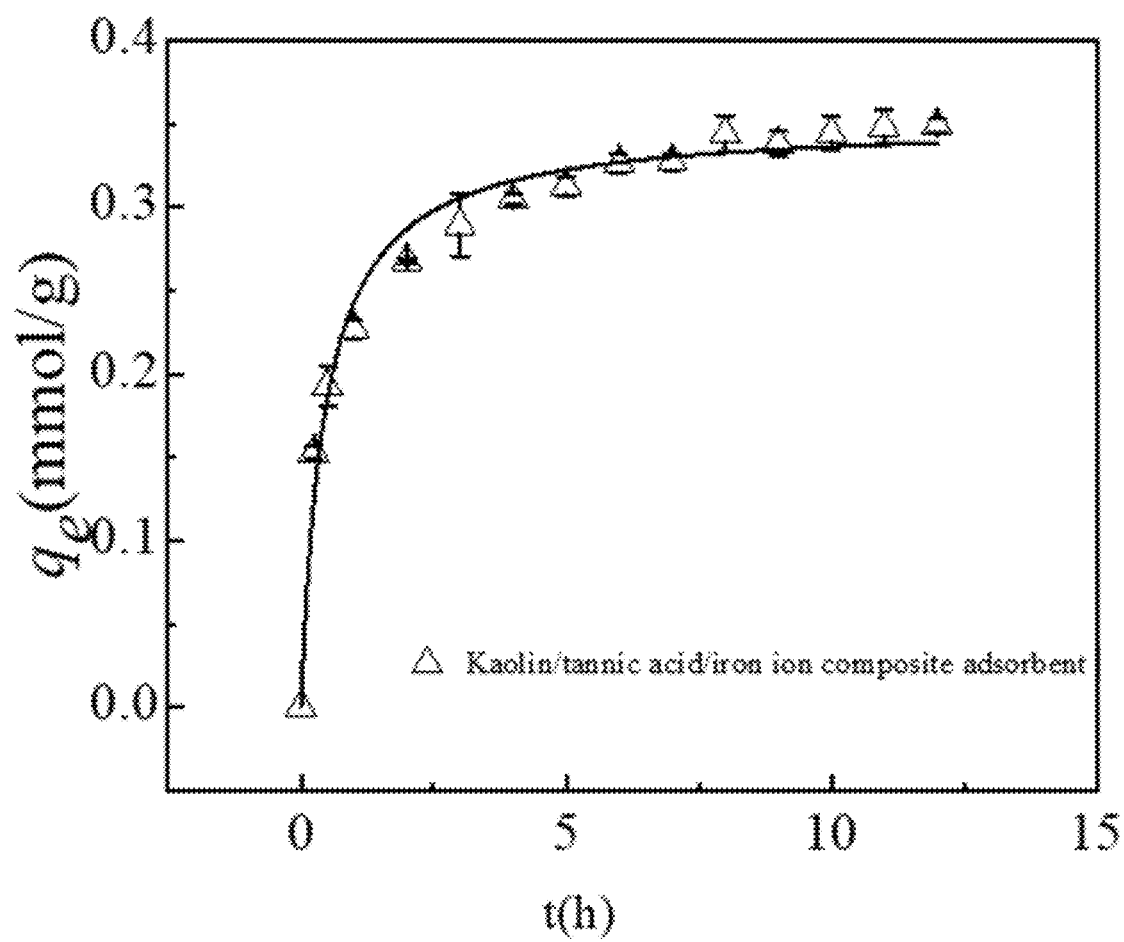
FIG. 4 illustrates an adsorption kinetics diagram of a kaolin/tannic acid/iron ion composite adsorbent for the fluoroquinolone antibiotic: ofloxacin according to an embodiment of the disclosure.

FIG. 3 illustrates a comparison diagram of adsorption effects by using wastewater including a fluoroquinolone antibiotic ofloxacin as a laboratory simulated water sample. FIG. 4 illustrates an adsorption kinetics diagram of the kaolin/tannic acid/iron ion composite adsorbent for adsorbing the fluoroquinolone antibiotic ofloxacin. An initial concentration of the ofloxacin in the wastewater is simulated as 0.2 mmol/L, and 10 mg of the composite adsorbent is added into 30 milliliters (mL) of ofloxacin solution to adsorb for 12 hours (h). A liquid chromatograph is used by the method to detect an actual adsorption capacity of products for adsorbing the ofloxacin. As shown in FIG. 3, adsorption effects of the above three composite adsorbents compared to adsorption effects of single kaolin and tannic acid/metal ion complex are significantly improved, this is mainly due to a compound of the kaolin with the tannic acid and the metal ions, a new composite body with a unique structure is formed, and the new composite body has a rougher surface and an increase in adsorption active sites. Meanwhile, it can be seen from Table 1 and FIG. 3 that adsorption capacities of the kaolin/tannic acid/titanium ion composite adsorbent, the kaolin/tannic acid/iron ion composite adsorbent and the kaolin/tannic acid/copper ion composite adsorbent gradually decrease, since metal ions with higher valence states have a stronger chelation with the ofloxacin, which greatly improve an adsorption capacity for the ofloxacin. As shown in FIG. 4, the adsorption capacity of the kaolin/tannic acid/iron ion composite adsorbent for the ofloxacin can basically reach adsorption saturation when adsorbing for 6 h, and a maximum adsorption effect can be reached when adsorbing for 12 h.

TABLE 1

A comparison of adsorption capacities of the above three types of composite adsorbents in the embodiment 1

| | Composite adsorbent | | |
| --- | --- | --- | --- |
| | Kaolin/tannic acid/copper ion composite adsorbent | Kaolin/tannic acid/iron ion composite adsorbent | Kaolin/tannic acid/titanium ion composite adsorbent |
| Adsorption capacity (mmol/L) | 0.261 | 0.377 | 0.422 |

Embodiment 2

A preparation method of a clay/tannic acid/metal ion composite adsorbent is provided, and the method includes the following steps 1-2.

In step 1, 2 g of the kaolin is added into the MOPS solution to obtain a solution, and the ultrasonic dispersion is performed on the solution to obtain a kaolin dispersion liquid.

In step 2, iron ion solutions with concentrations of 20, 30, 40, 50 and 60 mmol/L are respectively added into the kaolin dispersion liquid together with a tannic acid solution with a concentration of 10 mmol/L to obtain mixed solutions, the weight ratio of the tannic acid and the kaolin is 1:1, pH of the mixed solutions are adjusted to 7.5 to obtain alkaline mixed solutions, reacted solutions are obtained after the alkaline mixed solutions react at the room temperature for 1 min, and the reacted solutions are sequentially filtered, washed and dried at the room temperature to obtain kaolin/tannic acid/iron ion composite adsorbents with feed molar ratios of 1:2, 1:3, 1:4, 1:5 and 1:6 between the tannic acid and the metal ions, respectively.

Wastewater with enrofloxacin antibiotics is used as the laboratory simulated water sample, an initial concentration of the enrofloxacin antibiotics in the wastewater is simulated as 0.2 mmol/L, and 10 mg of the composite adsorbents are added into the wastewater to adsorb for 12 h. The liquid chromatograph is used by the method to detect an actual adsorption effect of products for adsorbing the enrofloxacin antibiotics, adsorption capacities of the composite adsorbents are compared to the adsorption capacity of the kaolin/tannic acid/iron ion composite adsorbent with the feed molar ratio of 1:4 (i.e., Table 2), with an increase of the feed molar ratio, the adsorption capacity of the kaolin/tannic acid/iron ion composite adsorbents for the enrofloxacin antibiotics first increases and then slightly decreases, and the adsorption capacity achieves an optimal effect when the feed molar ratio is 1:4.

TABLE 2 a comparison of adsorption capacities of the kaolin/tannic acid/iron ion composite adsorbents with different feed molar ratios in the embodiment 2

| | Feed molar ratio (tannic acid:iron ions) | | | | |
| --- | --- | --- | --- | --- | --- |
| | 1:2 | 1:3 | 1:4 | 1:5 | 1:6 |
| Adsorption capacity (mmol/L) | 0.183 | 0.261 | 0.381 | 0.364 | 0.355 |

Embodiment 3

A preparation method of a clay/tannic acid/metal ion composite adsorbent is provided, and the method includes the following steps 1-2.

In step 1, 10 g of attapulgite is added into a tri hydroxymethyl aminomethane (Tris) buffer solution to obtain a solution, and the ultrasonic dispersion is performed on the solution to obtain an attapulgite dispersion liquid.

In step 2, a tannic acid solution with a concentration of 1 mmol/L and a cooper ion solution with a concentration of 80 mmol/L are added into the attapulgite dispersion liquid to obtain a mixed solution, and a weight ratio of the tannic acid and the attapulgite is 1:1, a pH of the mixed solution is adjusted to 7 to obtain a neutral mixed solution, a reacted solution is obtained after the neutral mixed solution reacts at the room temperature for 1 min, and the reacted solution is sequentially filtered, washed and freeze dried to obtain a composite adsorbent.

Wastewater with tetracycline antibiotics is used as the laboratory simulated water sample, an initial concentration of the tetracycline antibiotics in the wastewater is simulated as 0.2 mmol/L, and 10 g of the composite adsorbent is added into the wastewater to adsorb for 12 h. The liquid chromatograph is used by the method to detect an actual adsorption effect of the product for adsorbing the tetracycline antibiotics.

Embodiment 4

A preparation method of a clay/tannic acid/metal ion composite adsorbent is provided, and the method includes the following steps 1-2.

In step 1, 1 g of bentonite is added into the MOPS buffer solution to obtain a solution, and the ultrasonic dispersion is performed on the solution to obtain a bentonite dispersion liquid.

In step 2, a tannic acid solution with a concentration of 100 mmol/L and a titanium ion solution with a concentration of 160 mmol/L are added into the bentonite dispersion liquid to obtain a mixed solution, and a weight ratio of the tannic acid and the bentonite is 1:1, a pH of the mixed solution is adjusted to 6.5 to obtain an acidic mixed solution, a reacted solution is obtained after the acidic mixed solution reacts at the room temperature for 1 min, and the reacted solution is sequentially filtered, washed and freeze dried to obtain a composite adsorbent.

Wastewater with sulfonamide antibiotics is used as the laboratory simulated water sample, an initial concentration of the sulfonamide antibiotics in the wastewater is simulated as 0.2 mmol/L, and 10 g of the composite adsorbent is added into the wastewater to adsorb for 12 h. The liquid chromatograph is used by the method to detect an actual adsorption effect of the product for adsorbing the sulfonamide antibiotics.

Embodiment 5

A preparation method of a clay/tannic acid/metal ion composite adsorbent is provided, and the method includes the following steps 1-2.

In step 1, 7 g of montmorillonite is added into the MOPS buffer solution to obtain a solution, and the ultrasonic dispersion is performed on the solution to obtain a montmorillonite dispersion liquid.

In step 2, a tannic acid solution with a concentration of 80 mmol/L and an aluminum ion solution with a concentration of 60 mmol/L are added into the montmorillonite dispersion liquid to obtain a mixed solution, and a weight ratio of the tannic acid and the montmorillonite is 1:1, a pH of the mixed solution is adjusted to 7 to obtain a neutral mixed solution, a reacted solution is obtained after the neutral mixed solution reacts at the room temperature for 1 min, and the reacted solution is sequentially filtered, washed and dried at the room temperature to obtain a composite adsorbent.

Wastewater with macrolide antibiotics is used as the laboratory simulated water sample, an initial concentration of the sulfonamide antibiotics in the wastewater is simulated as 0.2 mmol/L, and 10 g of the composite adsorbent is added into the wastewater to adsorb for 12 h. The liquid chromatograph is used by the method to detect an actual adsorption effect of the product for adsorbing the macrolide antibiotics.

Embodiment 6

A preparation method of a clay/tannic acid/metal ion composite adsorbent is provided, and the method includes the following steps 1-2.

In step 1, 5 g of illite is added into the Tris buffer solution to obtain a solution, and the ultrasonic dispersion is performed on the solution to obtain an illite dispersion liquid.

In step 2, a tannic acid solution with a concentration of 50 mmol/L and an magnesium ion solution with a concentration of 120 mmol/L are added into the illite dispersion liquid to obtain a mixed solution, and a weight ratio of the tannic acid and the illite is 1:1, a pH of the mixed solution is adjusted to 7.5 to obtain an alkaline mixed solution, a reacted solution is obtained after the alkaline mixed solution reacts at the room temperature for 1 min, and the reacted solution is sequentially filtered, washed and dried at the room temperature to obtain a composite adsorbent.

Wastewater with β-lactam antibiotics is used as the laboratory simulated water sample, an initial concentration of the β-lactam antibiotics in the wastewater is simulated as 0.2 mmol/L, and 10 g of the composite adsorbent is added into the wastewater to adsorb for 12 h. The liquid chromatograph is used by the method to detect an actual adsorption effect of the product for adsorbing the β-lactam antibiotics.

What is claimed is:

1. A method of preparing a kaolin clay/tannic acid/titanium ion composite adsorbent comprising:
    1(a) adding 2 g of kaolin clay into a buffer solution selected from the group consisting of tri hydroxymethyl aminomethane ($C_4H_{11}NO_3$) buffer solution and 3-morpholinopropanesulfonic acid ($C_7H_{15}NO_4S$) buffer solution to obtain a mixture, and
    1(b) ultrasonically dispersing the mixture to obtain a kaolin dispersion; and
    2(a) adding equal measures of a 10 mmol/L tannic acid solution and a 40 mmol/L titanium ion solution to the kaolin dispersion to obtain a mixed solution, wherein the weight ratio of tannic acid added to kaolin is 1:1;
    2(b) adjusting the pH of the mixed solution to 7.5 to obtain an alkaline mixed solution,
    2(c) reacting the alkaline mixed solution at room temperature for 1 min to obtain a reacted solution, and
    2(d) sequentially filtering, washing and drying the reacted solution to obtain the kaolin clay/tannic acid/titanium ion composite adsorbent.

2. The method of claim 1, wherein the drying is conducted at room temperature or by freeze-drying.

3. A method of adsorbing an antibiotic compound from sewage comprising:
    adding the kaolin clay/tannic acid/titanium ion composite adsorbent made by the method of claim 1 to sewage comprising the antibiotic compound; and
    adsorbing the antibiotic compound onto the composite adsorbent.

4. The method of claim 3, wherein the antibiotic compound is selected from the group consisting of sulfonamides, fluoroquinolones, tetracyclines, β-lactams and macrolides.

* * * * *